Figure 1:
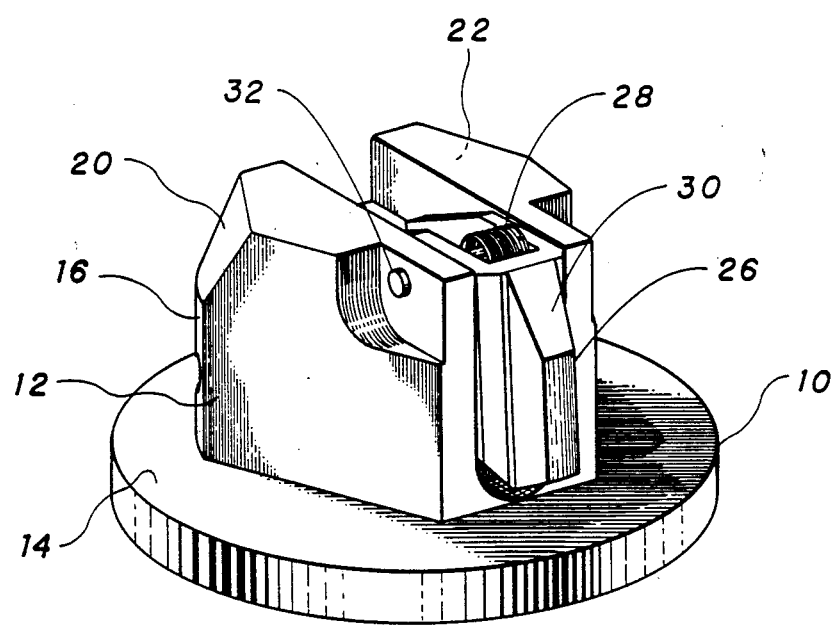

United States Patent [19]

Favrou

[11] Patent Number: 4,923,324
[45] Date of Patent: May 8, 1990

[54] ZERO CLEARANCE COUPLER FOR CONNECTING A DRIVING MEMBER TO A SPLINED HUB

[75] Inventor: John M. Favrou, Del Mar, Calif.

[73] Assignee: Eastman Kodak Company, Rochester, N.Y.

[21] Appl. No.: 375,308

[22] Filed: Jul. 3, 1989

[51] Int. Cl.[5] .............................................. B25G 3/28
[52] U.S. Cl. .................................... 403/359; 403/298; 403/330
[58] Field of Search ................ 403/359, 330, 383, 298

[56] References Cited

U.S. PATENT DOCUMENTS

| | | | |
|---|---|---|---|
| 2,452,742 | 11/1948 | Franzene | 403/359 X |
| 3,722,929 | 3/1973 | Gilman | 403/359 |
| 4,422,794 | 12/1983 | Deken | 403/330 |
| 4,701,068 | 10/1987 | Andrews et al. | 403/359 |

*Primary Examiner*—Andrew V. Kundrat
*Attorney, Agent, or Firm*—Daniel Robbins

[57] ABSTRACT

Rather than engage the grooves of a cartridge's splined hub by means of fingers attached to a reel motor shaft, the present invention uses a mechanical coupler mounted on the motor shaft which contacts the spline lands at two places and locks the mechanical coupler position by insertion of a spring loaded tongue into one of the grooves of the spline. This groove is angularly located midway between the lands which contact the mechanical coupler, effecting a "three point" engagement of the mechanical coupler with the hub. The land contacting surfaces and the tongue are chamfered to facilitate engaging the hub for slight off-axial misalignment of the hub and mechanical coupler. The spring loaded tongue forces the spline contacting surfaces of the mechanical coupler into a "zero clearance" fit with the contacted lands of the spline, providing an intimate and backlash free connection between the hub and driving motor.

9 Claims, 3 Drawing Sheets

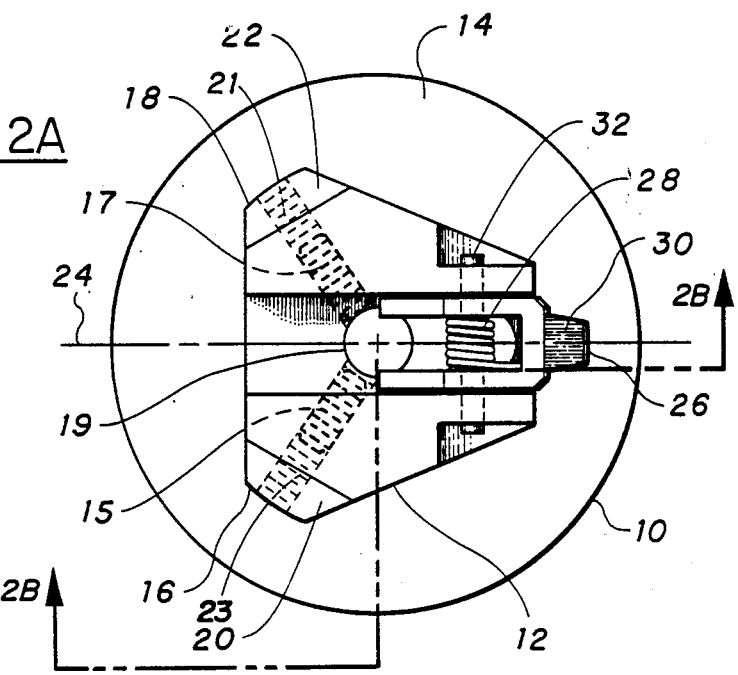
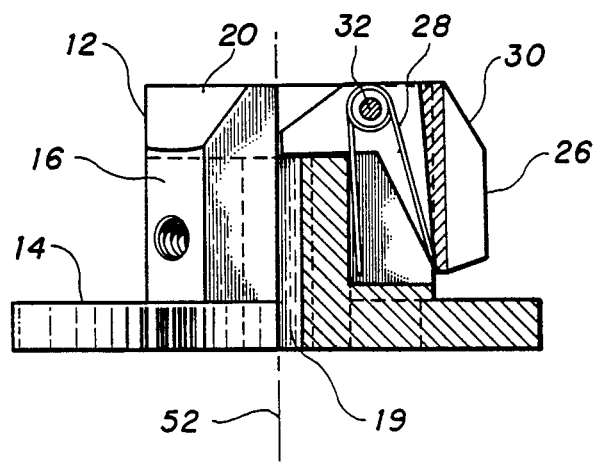

ZERO CLEARANCE COUPLER FOR CONNECTING A DRIVING MEMBER TO A SPLINED HUB

BACKGROUND OF THE INVENTION

1. Field of the Invention

This invention relates to a mechanical coupler for connecting a rotary driving member to a hub, and in particular, to a mechanical coupler for connecting a magnetic tape recorder motor drive shaft to the hub of a tape reel. Copending application Ser. No. 352,431 discloses a cartridge having splined hubs adapted for use with the mechanical coupler of the present invention.

2. Description Relative to the Prior Art

In magnetic recording, tape continues to play a prominent role as a storage medium for recorded signals. The tape is generally packaged either on individual reels or in cartridges for use with an associated recorder. In the prior art, it is known to mate the tape container to the recorder by means of a large variety of mechanisms and techniques, with the usual requirement that the tape container be readily installed and readily removed. Recorders which use individual supply and takeup tape reels characteristicallY use screw hold down mechanisms or quick disconnect mechanisms for coupling the tape reels to the reel driving motor shafts. In the more commonly used tape cartridges, the supply and takeup hubs are generally splined cylinders which slidingly engage with mating "fingers" of the drive motor spindles in the recorder. The hubs in the cartridge "float" in the cartridge housing so that the tolerances of the cartridge components may be relaxed while still ensuring that the hub will be capable of self alignment when placed over the drive shaft fingers. This allows rapid and simple changing of the inexpensive cartridges, and has proven an adequate means of drive motor-to-cartridge hub connection in the capstan controlled tape transport, where lack of precision in reeling system components generally will not adversely affect the flutter characteristics of the recorder.

A capstanless tape transport, in which the tape speed is completely under control of the transport reeling system is disclosed in U.S. Pat. No. 4,256,996 in the names of Brooks et al. This transport has low flutter characteristics; the tape speed is controlled by means of a microcomputer which maintains constant tape speed by continuous adjustment of the reel motor rotational speed. When such a transport is adapted for use with a removable cartridge, the "looseness" of the mating of the cartridge reel hubs and the drive motor spindle of the recorder, acceptable in the recorders of the prior art employing caPstans for tape speed control, results in unacceptable flutter. The present invention is directed to a quick connect-disconnect mechanical coupler mounted on the drive motor spindle for mating with a splined hub of a cartridge which provides positive and solid engagement, and which does not induce flutter in the tape motion for tape travel in either the forward or reverse directions.

SUMMARY OF THE INVENTION

Rather than engage the grooves of the cartridge hub spline by means of fingers attached to the reel motor shaft, the present invention uses a mechanical coupler mounted on the motor shaft which contacts the spline lands at two places and locks the mechanical coupler position by insertion of a spring loaded tongue into one of the grooves of the spline. This groove is angularly located midway between the lands which contact the mechanical coupler, effecting a "three point" engagement of the mechanical coupler with the hub. The land contacting surfaces and the tongue are chamfered to facilitate engaging the hub for slight off-axial misalignment of the hub and mechanical coupler. The spring loaded tongue forces the spline contacting surfaces of the mechanical coupler into a "zero clearance" fit with the contacted lands of the spline, providing an intimate and backlash free connection between the hub and driving motor.

DESCRIPTION OF THE INVENTION

Figure 3:
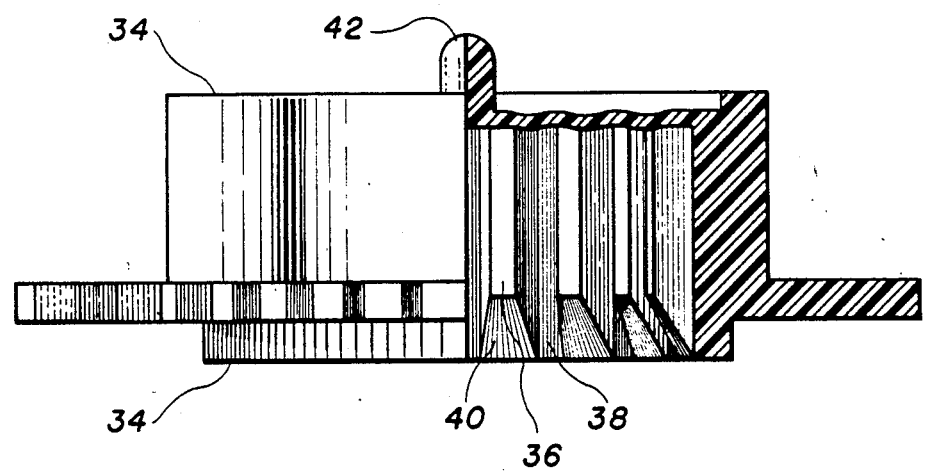

The invention will be described with respect to the figures, of which:

FIG. 1 is a perspective drawing of the mechanical coupler of the invention,

FIG. 2a provides a plan view of the mechanical coupler of the present invention, FIG. 2b provides an elevation view of the mechanical coupler of the present invention, FIG. 3 is a drawing of a hub incorporated in the cartridge of the copending application Ser. No. 352,431 for use with the mechanical coupler of the present invention, FIG. 4 is a sectional view showing the hub of FIG. 3 engaged with the mechanical coupler according to the invention.

Referring to FIG. 1, a mechanical coupler 10, for mounting on the spindle of the recorder drive motor, has a superstructure 12 containing the elements which mate with the splined hub of an associated cartridge. The cartridge hub fits over the superstructure 12 and, when mated to the mechanical coupler 10, the base of the hub comes to rest against the surface 14 of the mechanical coupler 10. A segment of the superstructure 12 comprises a surface 16 in the shape of a portion of a right circular cylinder having a lead-in chamfer 20, and a similarly positioned surface 18 having a lead-in chamfer 22, (the surfaces 18 and 22 are not seen in the view of FIG. 1), make surface to surface contact with lands of the spline of the mating hub. As seen in FIG. 2, the surfaces 16, 18 are symmetrically located with respect to a center line 24 of the superstructure 12. A tongue 26, which is rotatable about an axis 32 and having a chamfer 30, is symmetrically located on the center line 24 and is biased outward towards the periphery of the mechanical coupler 10 by a spring 28. The chamfers 22 on surface 18, 20 on surface 16 and 30 on the tongue 26 facilitate coupling when there is axial misalignment between the mechanical coupler 10 and a mating hub. The mechanical coupler 10 is provided with a hole, having an axis 52, for accepting the shaft of an associated drive motor. Tapped holes 21, 23 radially directed through the superstructure 12 perpendicular to the axis 52, and positioned to symmetrically intersect the surfaces 18, 16 respectively, are provided with set screws 17, 15 for securing the mechanical coupler to the associated motor shaft.

In FIG. 3, a splined hub 34 located in an associated cartridge has internal lands 36 and grooves 38. The lands 36 are chamfered to facilitate the mating of the hub 34 to the mechanical coupler 10 of the present invention. When the hub 34 is mounted in the associated cartridge and the hub is axially aligned with the mechanical coupler 10 for mating with the recorder reeling drive motor, a force is applied against a wear button 42 by means of the cartridge enclosure, which forces the hub 34 into abutment with the surface 14 of the mechanical coupler 10 (See FIG. 4).

Figure 4:
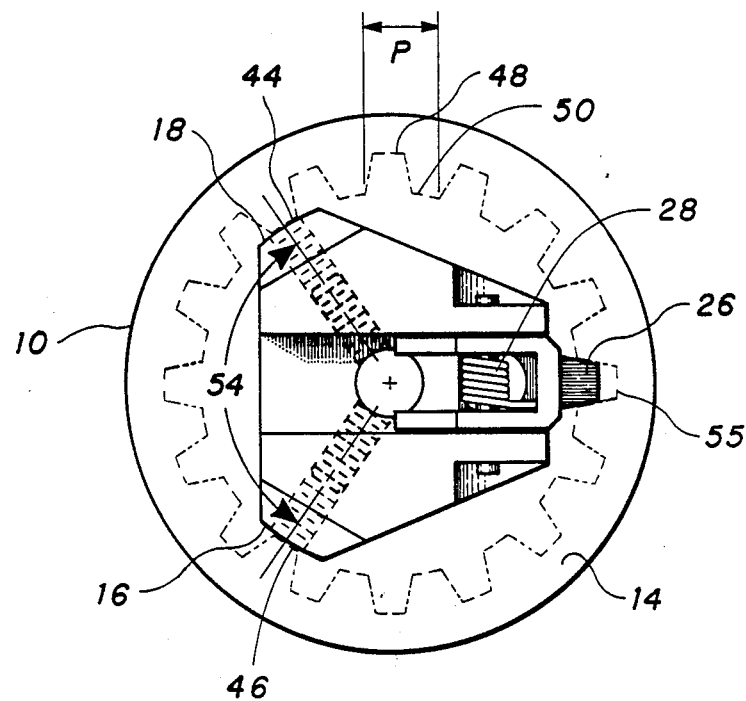

Referring to FIG. 4, the hub 34 splines and grooves are shown in phantom on the mechanical coupler 10, and typical lands 44, 46 are seen in contact with the surfaces 18, 16 respectively. The pitch length, "p" of the spline is defined as the distance along the spline periphery encompassing one groove and one adjacent land, e.g. groove 48 and land 50. The surfaces 16, 18, as previously noted, are surface segments of right circular cylinders whose axes are parallel to the axis 52 (FIG. 2) of the mechanical coupler 10. The circumferential dimensions of the surfaces 16, 18 are equal to, or greater than, the pitch length p. The angular separation 54 between the surfaces 16, 18 are such that when the surface 18 is centered on, and is symmetrically in contact with a land, e.g. 44, the surface 16 is similarly centered on and symmetrically in contact with another land e.g. 46. Under these conditions, the tongue 26 is positioned directly over a groove, e.g. 55, and the spring 28 forces the tongue 26 into the groove e.g. 55 so that the sides of the tongue 26 contact the sides of the groove 55. The spring force of the tongue 26 in the groove 54 results in transmitted force components urging the surface 18 against the land e.g. 44 and the surface 16 against the land e.g. 46. The lands e.g. 44, 46 are slightly concave toward the center of the hub 34, and have radii equal to the radii of the cylindrical surfaces 16, 18. Thus, when the surfaces 16, 18 are forced against the lands e.g. 46, 44 hard surface to surface contacts occur, i.e. there is a zero clearance fit. The two zero clearance fits and the tongue in its mating groove provide a three "point" contact between the hub and the mechanical coupler which firmly couple them together. It will be appreciated that if the mechanical coupler 10 and the hub 34 are not rotationally in correct alignment when they are positioned for mating, upon excitation of the drive, the drive shaft will rotate and at an appropriate angular position the tongue 26 will drop into a groove e.g. 55, and firm coupling will be effected as described above.

The invention has been described in detail with particular reference to preferred embodiments thereof, but it will be understood that variations and modifications can be effected within the spirit and scope of the invention.

What is claimed is:

1. A mechanical coupler comprising:
   a. a planar base having a cylindrical aperture located at the center thereof, the axis of said aperture being perpendicular to said planar base,
   b. a member having a yoked section, said member being mounted on said base,
   c. a first cylindrical convex surface segment of said member, said surface facing radially outward from said center with the cylindrical axis of said first surface segment perpendicular to said planar base,
   d. a second cylindrical convex surface segment of said member, said surface facing radially outward from said center with the cylindrical axis of said second surface segment perpendicular to said planar base, wherein said first and said second surface segments are symmetrically positioned on said member about a line through said center, said line lying in said planar base,
   e. a planar lamina, pivotally mounted on said yoked section of said member, wherein the plane of said lamina lies along said line in said base, said plane of said lamina being perpendicular to said base,
   f. a spring pivotally urging said lamina along said line in a direction outward from said center, whereby the spring force lies along said line, and
   g. means associated with said member adapted for fastening said coupler to an auxiliary drive shaft.

2. The coupler of claim 1 wherein the said ends of first and second surface segments distal to said base, are chamfered.

3. The coupler of claim 1 wherein the edge of said lamina distal to said base, is chamfered.

4. The coupler of claim 1 wherein said means associated with said member for fastening is a cylindrical opening through said member coaxial with said aperture, having first and second set screws radially positionable with respect to said opening.

5. A mechanical coupler in combination with a splined hub, said splined hub having a plurality of axially directed lands and grooves internally located on a cylindrically shaped cavity therein, said mechanical coupler adapted for mating with said hub by axial insertion into said cavity, said mechanical coupler comprising:
   a. a planar base,
   b. a first cylindrical surface segment attached to said base, whereby when said coupler is mated with said hub, said first surface contacts at least a first land of said hub,
   c. a second cylindrical surface segment attached to said base, whereby when said coupler is mated with said hub, said second surface contacts at least a second land of said hub,
   d. a tongue pivotally attached to said base,
   e. a spring urging pivotal rotation of said tongue, whereby when said coupler is mated with said hub, said tongue under urging by said spring engages a groove of said hub, and said tongue, said first surface segment and said second surface segment provide a threefold contacting engagement between said coupler and said hub.

6. The mechanical coupler of claim 5 wherein the circumferential dimensions of said first and said second cylindrical surface segments are no less that the distance along the spline periphery encompassing one groove and one adjacent land of said hub.

7. The mechanical coupler of claim 5 wherein said first and said second surface segments are angularly positioned on said base whereby when said coupler is mated to said hub, said spring urging said tongue against said groove provides a reaction force urging said first and said second surface segments against said first and second lands of said hub.

8. The mechanical coupler of claim 5 wherein the ends of said first and said second surface segments distal to said base, are chamfered.

9. The mechanical coupler of claim 5 wherein the end of said tongue distal to said base is chamfered.

* * * * *